Dec. 22, 1953
F. MÜLLER ET AL
2,663,560
HEAT PROCESSING OF FINE-GRAINED
MATERIAL, PARTICULARLY
CEMENT RAW MATERIAL
Filed Dec. 7, 1951
2 Sheets-Sheet 2
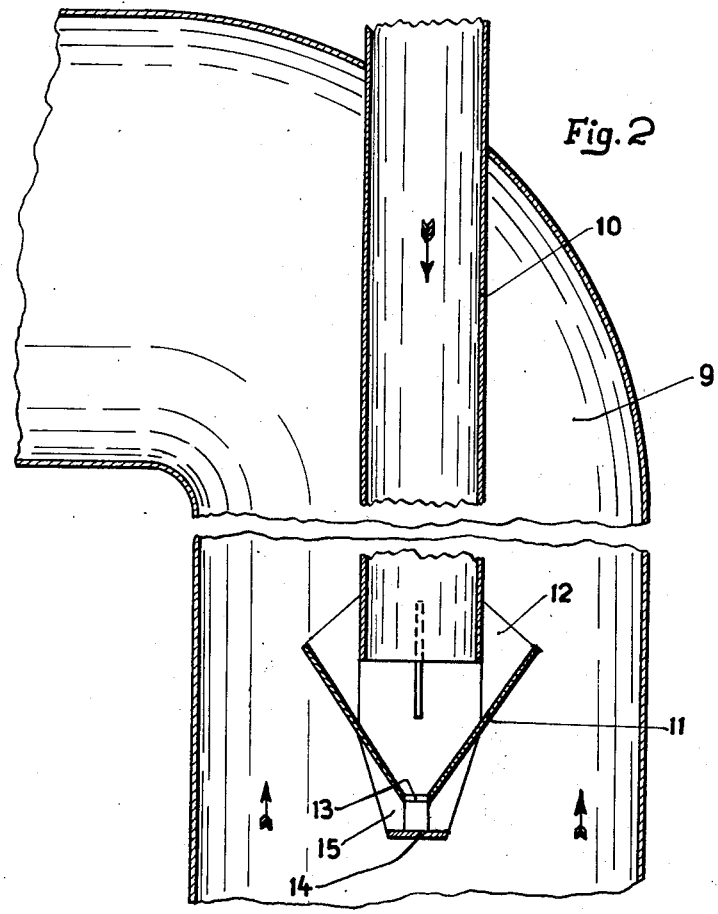
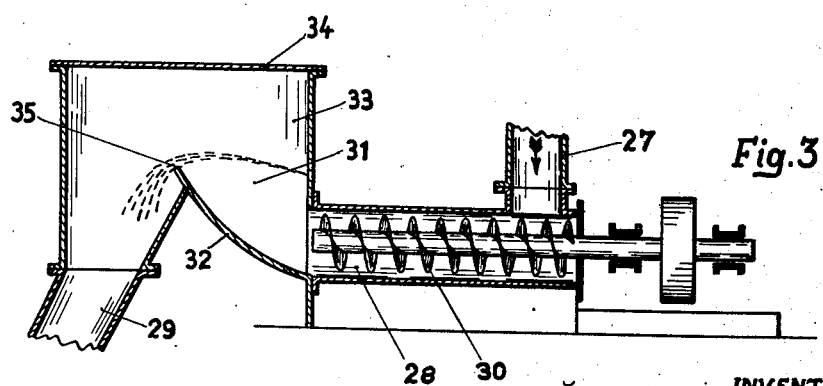
INVENTOR
Franz Müller
Leonhard H. Skinner
BY
Kinney Bros.
Attorneys Patented Dec. 22, 1953

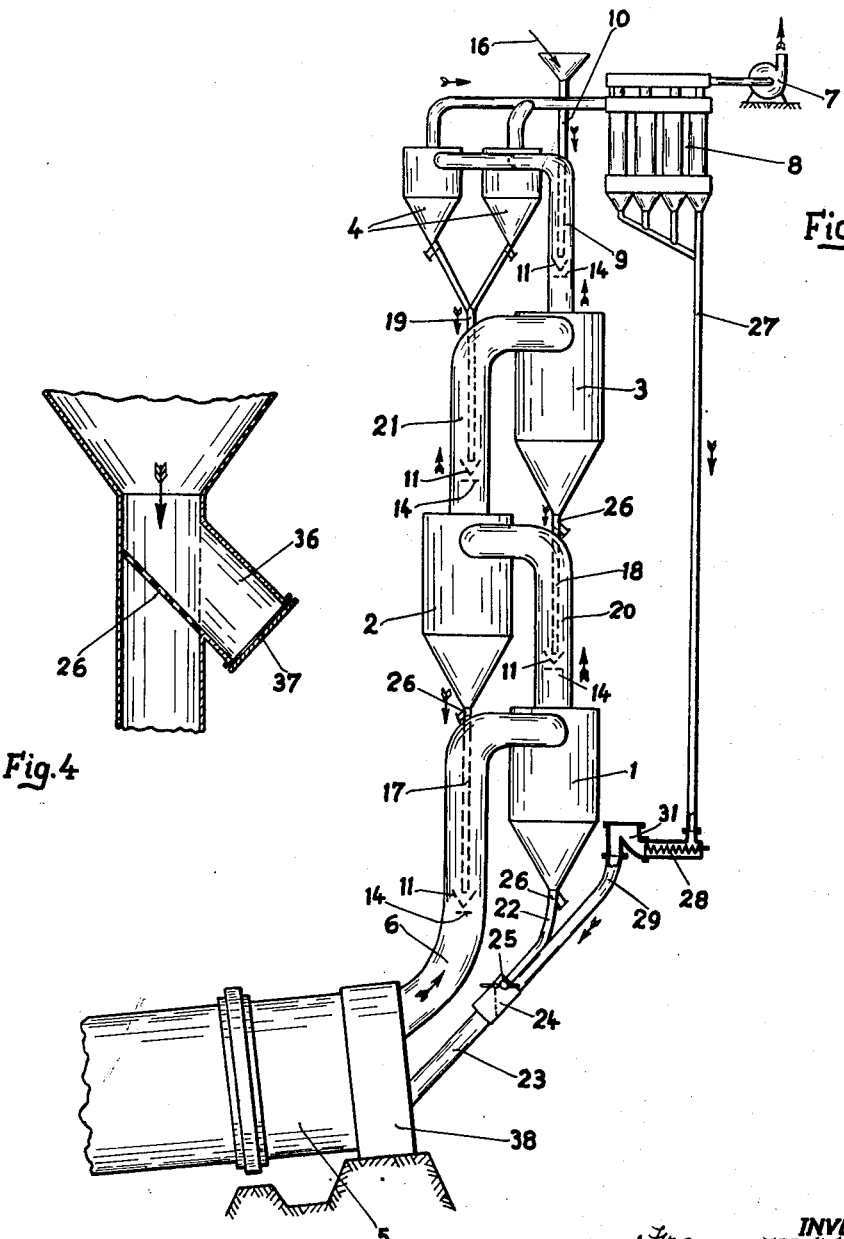

2,663,560

UNITED STATES PATENT OFFICE 2,663,560

HEAT PROCESSING OF FINE-GRAINED MATERIAL, PARTICULARLY CEMENT RAW MATERIAL

Franz Müller, Bensberg-Refrath, and Leonhard H. Winners, Koln-Kalk, Germany, assignors to Klöckner-Humboldt-Deutz A. G., Koln (Rhine), Germany, a German corporation Application December 7, 1951, Serial No. 260,552

9 Claims. (Cl. 263—30)

This invention concerns methods and means for the heat processing of pulverulent or other fine-granular material and, in one of its particular aspects, to the heating of cement raw material by exit gases from a rotary kiln to which the material is being supplied. The invention is related to that of the application of Franz Müller, Serial No. 260,553, filed concurrently and assigned to the assignee of the present invention.

One of the known apparatus for the heating of cement raw material by kiln exit gases comprises a number of serially interconnected cyclone-type heat exchangers designed and operative in the manner of rotary-gas-flow dust separators. The kiln gases are forced through these separators (cyclones) by a blower and the material to be heated is passed through the cyclones in counterflow to the gases, the dust discharge pipe of each cyclone, with the exception of the one adjacent to the kiln, being joined with the gas outlet conduit of the preceding cyclone of the series.

In the known apparatus considerable pressure differences occur between the individual cyclones and the rotary kiln, and it is difficult to prevent the gases from flowing in wrong directions.

It is an object of the invention to obviate or greatly reduce this shortcoming and difficulty.

More specifically, the invention, dealing with a processing method and equipment generally of the above-mentioned kind, aims at securing a simple and reliable transfer of the dust discharge from one cyclone to a preceding one of the cyclone group without the danger of hot gases passing through the dust discharge pipe.

Another object of the invention is to satisfactorily and economically solve the problems, which may arise with apparatus according to the invention, of conveying dust or the like fine-grained material between spaces of different respective pressures without resulting in undesired pressure equalization.

According to a feature of the invention, the dust discharge pipe, leading from one cyclone to the gas outlet conduit of another cyclone of the same group of heat exchanging separators, extends into the interior of that gas conduit and has its discharge opening located substantially on the conduit axis. Furthermore, the dust, issuing from the opening of the pipe, is trapped or baffled so as to accumulate an amount of dust in front of the discharge opening thus sealing the dust discharge pipe against the gases passing through the conduit. According to a more specific feature of the invention the baffle means for trapping the dust consist essentially of an upwardly flaring funnel structure whose circular rim forms an overflow for the dust material being discharged. In this manner, an escape of gases through the dust discharge pipe is safely prevented with the advantage of avoiding the necessity of having movable parts operate in the hot current of gas. Such an apparatus also affords a substantially uniform distribution of the dust material overflowing from the funnel-shaped structure into the ascending gas flow so that a good heat exchange is obtained.

According to still another feature of the invention the entire group of cyclones is terminated at its upper end by a dust separating device disposed ahead of the draft blower. The dust collected by the separating device is also fed into the kiln by means of a pipe conduit. Since there is a considerable pressure difference between the final dust separating device and the kiln, the pipe conduit must be especially well sealed. Therefore, an approximately horizontal conveyor screw and an adjacent trap chamber with an overflow edge are disposed between the dust separating device and the lower portion of the pipe conduit leading to the kiln. The overflow trap also protects the mechanical parts of the conveyor screw from the high temperatures obtaining in the kiln-adjacent portion of the pipe conduit.

The foregoing and other objects, advantages and features of the invention will be apparent from the following description in conjunction with the embodiment of the invention illustrated on the drawings in which:

Fig. 1 shows schematically an apparatus for the heat processing of cement raw material by hot exit gases of a rotary kiln;

Fig. 2 shows on a larger scale a cross sectional view of one of the portions of the same apparatus at which dust from one of the pertaining cyclones is discharged into the gas outlet conduit of another cyclone;

Fig. 3 shows schematically and in section a conveyor and trap device also pertaining to the apparatus of Fig. 1;

Fig. 4 shows a schematical cross section of another portion of the same apparatus serving for the elimination of foreign bodies from the dust discharge of the cyclones.

As apparent from Fig. 1, the illustrated heating apparatus comprises a group of heat exchangers 1, 2, 3 and 4 connected to a rotary kiln 5. Each exchanger consists of a rotary-gas-flow separator (cyclone) to which the gas is supplied tangentially and, hence, is caused to rotate before leaving the vessel through the gas outlet conduit. For better dust separation, the cyclone 4 is composed of two parallel-connected individual cyclone units each of smaller cross section and volume than any of the other cyclones.

The cyclone 1 is connected through a gas conduit 6 with the stationary hood 38 of the kiln. The hot exit gases from the kiln pass through this conduit into the cyclone 1 and thence successively through the cyclones 2, 3 and 4. The gases are exhausted by a blower 7 through a dust separating device 8 disposed at the end of the gas flow path. The device 8 comprises several cyclone units of correspondingly smaller diameters.

The cement raw material is supplied through a hopper 16 whence it passes through a supply pipe 10 into the gas conduit 9 leading from cyclone 3 to cyclone 4. The supply pipe 10 extends axially within the gas conduit 9 along an appreciable portion of this conduit so that the discharge end of the supply pipe is close to the top of the cyclone 3.

As best apparent from Fig. 2, an upwardly flaring funnel structure 11 is mounted below the opening of the supply pipe 10. The funnel 11 is attached to pipe 10 by means of connecting webs 12. Its upper rim is preferably slightly higher than the discharge opening of pipe 10. The funnel 11 has an opening 13 at its bottom, and a disc 14 is disposed below this opening in spaced relation thereto. Disc 14 is fastened to the funnel structure 12 by connecting webs 15.

The raw material drops through pipe 10 into the funnel 11 and, during the operation of the apparatus, keeps the funnel space filled because the opening 13 is relatively small. Consequently, the material flows mainly over the circular upper edge of the funnel. At the same time, a smaller portion of the supply passes through the opening 13 and flows over the circular rim of disc 14 thus entering the ascending gas current in a uniform distribution. The distance of the disc 14 from the bottom opening 13 of the funnel is sufficiently large to prevent clogging of the material at this point. The filled funnel space forms a gas trap and hence prevents the ascending gas from entering into the supply pipe 10.

The dust material separated within the cyclones 2, 3 and 4 is introduced in the same manner as just explained with reference to Fig. 2 from the dust discharge pipe 17, 18 and 19 into the respective gas conduits 6, 20 and 21. The dust separated within the cyclone 1 drains through pipes 22 and 23 into the rotary kiln. A pendulous flap 24 is interposed between pipes 22 and 23. Flap 24 may be adjusted by levers and a weight 25 so that it has a slight closing moment which is overpowered by the dropping dust. The pendulous flap 24 prevents the entrance of kiln gases into the discharge pipe 22.

The path of travel of the dust material from hopper 16 to the kiln 5 may be traced as follows. The material, passing from hopper 16 through supply pipe 10 into the gas outlet conduit 9 of cyclone 3, is entrained by the upward flow of hot gases and is thus conveyed in suspension to the next higher cyclone 4. In cyclone 4, the dust separated from the gases passes through dust discharge pipe 19 into the gas outlet conduit 21 of cyclone 2. The upward flow of hot gases in conduit 21 carries the dust into cyclone 3 where the dust is again separated from the gases to drain through discharge pipe 18 into the upstream of gases within gas outlet conduit 20 of cyclone 1 to be conveyed upwardly into cyclone 2. The dust separated from the gases in cyclone 2 then drains through discharge pipe 17 into the gas conduit 6 and is again entrained by the upward flow of gases, thus reaching the lowermost cyclone 1 from which the separated dust is admitted to the kiln as described.

It will be recognized that the travelling path of the dust material, though generally downward in opposition to the upward flow of hot kiln gases, follows a zig-zag course which meanders between the two vertical separator columns, and that the material is alternately conveyed downwardly by gravity and upwardly by suspension within the forced flow of hot gases.

A screening device for eliminating foreign inclusions is preferably provided at the lower end of each cyclone. According to Fig. 4, the screening device comprises a slanted screen 26 across the pertaining dust discharge pipe. Adjacent to the screen 26 is a branch stub 36 covered by a lid 37. Larger pieces of material that may be included in the dust discharge, for instance, pieces of insulating masonry broken off the cyclone walls, are retained on the screen 26 and can be removed by opening the lid 37.

The material separated from the gas flow in the final dust separating device 8 passes through a pipe 27 into a pressure lock 28 from which it reaches the kiln through a connecting pipe 29 joined with the above-mentioned pipe 23. The pressure lock 28, separately shown in Fig. 3, has a conveyor or feed screw 30 which passes the material from the discharge pipe 27 into a trap chamber 31. Chamber 31 is bordered by a curved wall portion 32 of a box 33 closed by a removable cover 34. The material conveyed by the screw 30 is trapped at the curved wall 32 and continuously overflows from the trap into the connecting pipe 29. The trap thus forms a gas seal between pipes 29 and 27 which prevents an equalization of the pressure difference existing between them. The trap seal also protects the mechanical parts of the screw 30 from the high temperature obtaining in the lower part of the pipe conduit.

A lock device according to Fig. 3 is also advantageous in other cases or for more general purposes where pourable material is to be introduced through a pipe or into a container filled with hot gases.

The opening 13 at the lower end of the funnel structure 11 serves the purpose of permitting a continuous escape of a small amount of dust so that the entire contents of the funnel space is kept in motion and is completely drained when the apparatus is set out of operation. This eliminates the danger of hot or sticky material baking or otherwise adhering to the funnel.

Preferably the depth to which the dust discharge pipes, such as pipe 10 (Fig. 2) enter into the trap space of the funnel structure 11 is made adjustable. The most favorable depth depends upon the pouring weight of the raw material as well as upon the pressure difference obtaining at this point between the interior of the pipe 10 and the interior of the gas conduit 9. The same applies also to the discharge ends of pipes 17, 18, and 19. That is, the entrance depth of these pipes into the corresponding funnel structures is preferably also made adjustable.

The apparatus illustrated in Fig. 1 and described above involves features not claimed herein which are also disclosed and are claimed in the patent application of Franz Müller, entitled Apparatus for Heating Fine-Grained Material Particularly Cement Raw Material and filed concurrently herewith.

It will be obvious to those skilled in the art upon a study of this disclosure that the invention permits of variations, modifications other than those specifically described, without departing from the essence of the invention and within the scope of the claims annexed hereto.

We claim:

1. The process of heating dust material such as cement raw material by hot gases in a vertically arranged series of centrifugal gas-from-dust separators, which comprises passing the hot gas serially and upwardly through the centrifugal separators; gravity feeding the material directly to a point within the gas flow entering the uppermost separator of the series so that the material is conveyed by the gas flow into said uppermost separator; gravity feeding the separated dust from each upper separator down to a point within the gas flow entering the next lower separator of the series to thereby cause the dust to be conveyed by the gas flow into the next lower separator; gravity discharging the heated dust from the lowermost separator; and retaining at each dust discharge point an amount of dust sufficient to prevent the gas from passing through the dust being fed into the gas flow.

2. The process of heating fine-granular cement raw material in a vertically arranged series of rotary-gas-flow separators by kiln waste gases, which comprises forcing the kiln waste gases serially and upwardly through the separators, introducing the material into the gas flow entering the uppermost separator; discharging separated dust from each upper separator into the gas flow entering the next lower separator; passing the separated dust from the lowermost separator into the kiln, and trapping in each dust discharge path an amount of dust sufficient to prevent the gases from passing through the dust discharge.

3. Apparatus for heating dust material such as cement raw material by hot gases, comprising a plurality of separators spaced vertically and horizontally from each other; each separator having a lateral gas inlet, a gas outlet on the top of the separator, and a dust discharge pipe extending downward from the bottom of the separator; a plurality of gas conduits spaced vertically and horizontally from each other, each conduit having a substantially vertical portion aligned with the dust discharge pipe of one of said respective separators and having a lateral portion extending from the top of said vertical portion laterally to the gas inlet of the separator next below said one separator; each of said gas conduits, with the exception of the lowermost one, having its vertical portion extending upwardly from the gas outlet of one of said respective separators; a dust supply pipe extending from above into said vertical portion of the uppermost conduit; each of said pipes, with the exception of the lowermost pipe, having a downwardly directed discharge opening located within one of said respective vertical conduit portions; and a dust trap disposed at said respective discharge openings to accumulate in said opening an amount of dust for preventing gas from passing upwardly through said pipes.

4. Apparatus for heating dust material such as cement raw material by hot gases, comprising a plurality of separators disposed one above the other, each separator having an inlet, a gas outlet and a dust discharge pipe; a gas conduit connecting the gas outlet of each lower separator with the inlet of the next upper separator, and another gas conduit connected with the inlet of the lowermost separator, whereby said separators and conduits form a gas path extending upwardly in series through said separators; blower means joined with said path for forcing a flow of gas therethrough; a dust supply pipe passing from above into the gas conduit connected with the inlet of the uppermost separator, said dust discharge pipe of each upper separator extending downward into the gas conduit connected with the inlet of the next lower separator, whereby dust is gravity fed through each of said pipes into said respective conduits and is gas-flow conveyed upwardly in said conduits to said respective separators; and a dust trap disposed below the discharge opening of each of said pipes to accumulate an amount of dust for preventing the gas flow from passing through said pipes.

5. Apparatus for heating dust material such as cement raw material by hot gases, comprising a plurality of separators disposed one above the other, each separator having an inlet, a gas outlet and a dust discharge pipe; a gas conduit connecting the gas outlet of each lower separator with the inlet of the next upper separator, and another gas conduit connected with the inlet of the lowermost separator, whereby said separators and conduits form a gas path extending upwardly in series through said separators; a dust supply pipe passing from above into the gas conduit connected with the inlet of the uppermost separator, said dust discharge pipe of each upper separator extending downward into the gas conduit connected with the inlet of the next lower separator and having a discharge opening centrally within the latter gas conduit; an upwardly flaring funnel structure disposed beneath each of said discharge openings in spaced relation thereto to collect an amount of dust for preventing the gas from escaping through said opening, said funnel structure having a bottom hole so that dust may pass over the funnel rim and through said hole, and a horizontal distributing disc disposed below said hole in spaced relation thereto.

6. In apparatus according to claim 3, a gas outlet conduit connected with said outlet of said uppermost separator; a dust separating device connected to said outlet conduit and having a downwardly extending dust discharge pipe communicating with the dust discharge pipe of said lowermost separator; and dust conveying means interposed between said latter two discharge pipes and having a mechanical dust conveying device and gas trap means.

7. In apparatus according to claim 3, a gas outlet conduit connected with said outlet of said uppermost separator; a dust separating device connected to said outlet conduit and comprising a plurality of separator units connected parallel to each other and having each a smaller flow cross section than said separators, said separating device having a downwardly extending dust discharge pipe common to said units; an approximately horizontal feed screw with an adjacent trap chamber having an overflow edge member disposed between said latter pipe and said dust discharge pipe of said lowermost separator.

8. In combination, a rotary kiln for processing cement raw material, a series of cyclone-type separators arranged above one another, each separator having a lateral inlet, a gas outlet on the top of the separator, and a bottom pipe for the discharge of dust; a gas conduit extending upwardly from the gas outlet of each lower separator to the inlet of the next higher separator, the lowermost separator of said series having its gas inlet and its dust discharge pipe connected with said kiln to receive gas from said kiln and supply heated raw material to said kiln respectively; blower means joined with said series to force gas from said kiln upwardly through said series; each of said remaining dust discharge pipes extending downwardly into the gas conduit leading to the inlet of the next lower separator and having a downwardly directed dust discharge opening within said latter gas conduit; material supply means having a supply pipe extending into the gas conduit leading to the inlet of the uppermost separator of said series, and a dust trap disposed beneath each of said openings within the pertaining gas conduit to collect an amount of discharge dust for closing said opening against escape of gas whereby the dust material is fed exclusively by gravity and gas-flow conveyance from said material supply means through all conduits and separators down into said kiln.

9. In a combination according to claim 8, a check means interposed between said kiln and the dust discharge pipe of said lowermost separator of said series, said check means having a pendulous lid member for substantially unidirectional flow of dust from said latter pipe toward said kiln.

FRANZ MÜLLER.
LEONHARD H. WINNERS.

References Cited in the file of this patent

UNITED STATES PATENTS

| Number | Name | Date |
|---|---|---|
| 241,108 | Wiesbock | May 3, 1881 |
| 729,009 | Sutton et al. | May 26, 1903 |
| 2,014,764 | Gram | Sept. 17, 1935 |
| 2,077,346 | Voskamp | Apr. 13, 1937 |
| 2,290,068 | Petersen | July 14, 1942 |
| 2,409,707 | Roetheli | Oct. 22, 1946 |
| 2,554,413 | Kuhn | May 22, 1951 |
| 2,559,876 | Hoekstra | July 10, 1951 |
| 2,574,503 | Simpson | Nov. 13, 1951 |
| 2,574,850 | Utterbach et al. | Nov. 13, 1951 |
| 2,648,532 | Muller et al. | Aug. 11, 1953 |